United States Patent [19]
Burst et al.

[11] Patent Number: 5,069,499
[45] Date of Patent: Dec. 3, 1991

[54] MOTOR VEHICLE HATCHBACK AND A METHOD FOR PRODUCING SAME

[75] Inventors: Hermann Burst, Rutesheim; August-Wilhelm Gösse, Mönsheim; Günter Scädlich, Weil der Stradt; Georg Hötzer, Schwieberdingen, all of Fed. Rep. of Germany

[73] Assignee: Dr. Ing. h.c.F. Porsche AG, Fed. Rep. of Germany

[21] Appl. No.: 611,655

[22] Filed: Nov. 13, 1990

[30] Foreign Application Priority Data

Nov. 20, 1989 [DE] Fed. Rep. of Germany ....... 3938476

[51] Int. Cl.$^5$ .............................................. B60J 1/04
[52] U.S. Cl. .................................. 296/201; 296/146; 296/93; 296/180.1
[58] Field of Search ................. 296/201, 84.1, 93, 146; 52/208, 400

[56] References Cited

U.S. PATENT DOCUMENTS 4,139,234  2/1979  Morgan ................................ 296/201

FOREIGN PATENT DOCUMENTS 7814079   9/1978   Fed. Rep. of Germany .
2192023  12/1989   United Kingdom ................ 296/201
0122545  10/1984   European Pat. Off. .
0368817   5/1990   European Pat. Off. .
7814079   9/1978   Fed. Rep. of Germany .
63-0045012 2/1988  Japan .
63-297009 12/1988  Japan .
2092655A  8/1982   United Kingdom .
WO88/04985 7/1988  World Int. Prop. O. .

Primary Examiner—Robert R. Song
Attorney, Agent, or Firm—Evenson, Wands, Edwards, Lenahan, & McKeown

[57] ABSTRACT

Hatchback for a motor vehicle comprises a bordering frame which is glued together with and surrounds at least in part an edge area of a window. The bordering frame, at least in a partial area of its circumferential course, has a covering part resting on the exterior side of the window and on the bordering frame. In order to provide such a hatchback which has a simple construction, can be manufactured fast and at low cost, and reliably meets the requirements with respect to tightness, a method of manufacture forms the covering part by direct foaming around the bordering frame and of an edge area of the window.

10 Claims, 5 Drawing Sheets

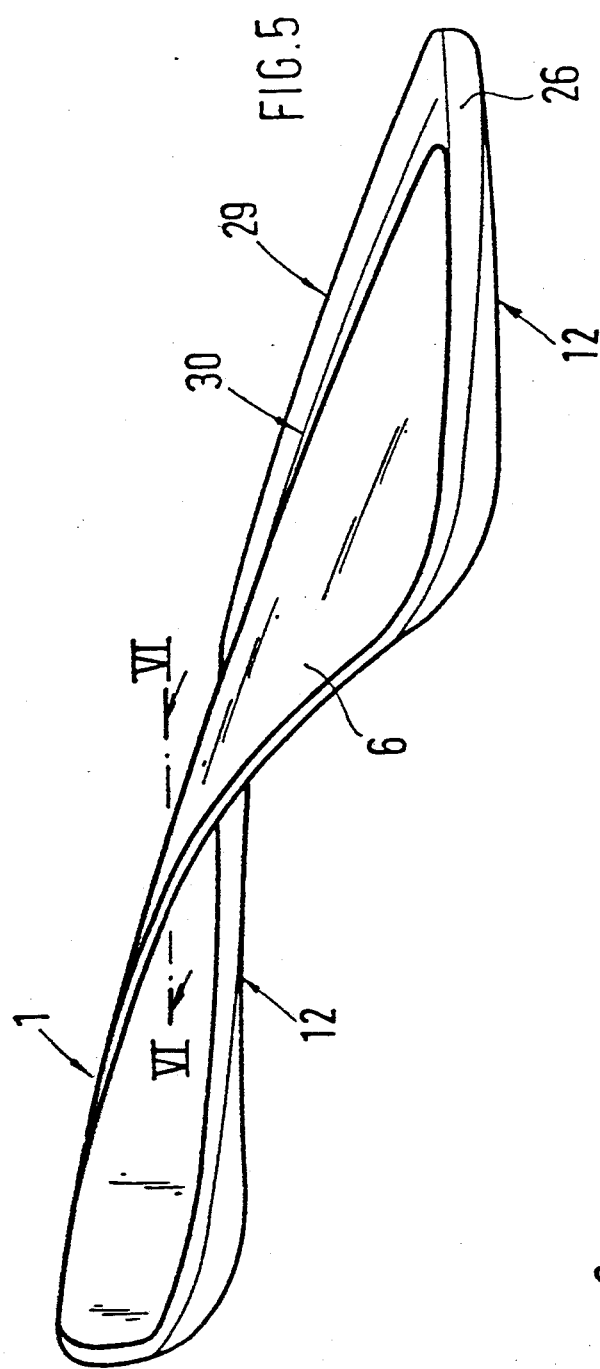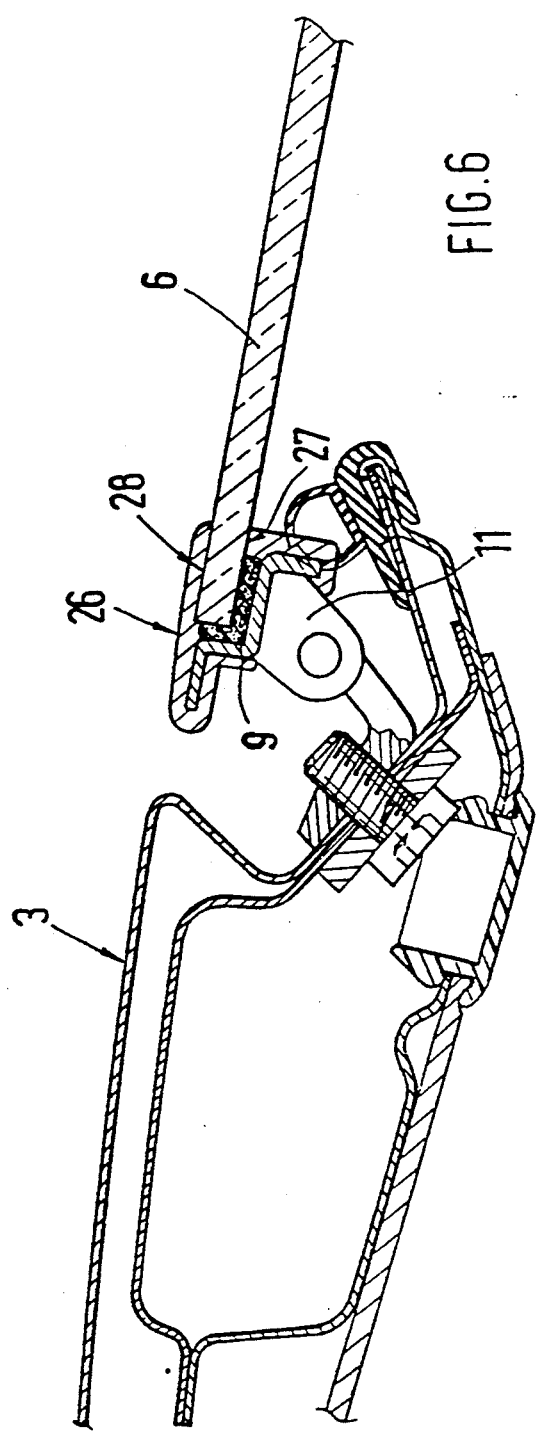

MOTOR VEHICLE HATCHBACK AND A METHOD FOR PRODUCING SAME

BACKGROUND AND SUMMARY OF THE INVENTION

The present invention relates to a motor vehicle having a bordering frame which is glued together with an edge area of a window while surrounding it. The bordering frame, at least in a partial area of its circumferential course, has a covering part resting on the exterior side of the window and on the bordering frame and is an elastic body.

A hatchback shown in DE-GM 78 14 079 has a bordering frame which, on the circumference side, by way of a surface gluing, is connected with an edge area of a rear window. In order to improve the drag coefficient, a covering part which forms an air guiding device or spoiler is provided at the rear transversely extending area and in sections at both lateral longitudinally directed areas of the bordering frame and is locally screwed together with the bordering frame disposed under it. The covering part comprises an elastic body made of PU-foam in which a holding part is embedded.

This hatchback functions, but it has the disadvantage that the covering part must be manufactured separately and connected with the bordering frame subsequently. This makes the manufacturing and the mounting time-consuming. In addition, a large number of fastening elements is required for connecting the bordering frame and the covering part. The mounting of the covering part must be carried out precisely so that no water enters between the window, the bordering frame and the covering part, passing through into the trunk disposed underneath. As a result of the many fastening points for the covering part, tolerance problems may occur during the mounting.

It is an object of the present invention to provide a hatchback having a window fastened in a bordering frame, and a covering part which has a simple construction, can be manufactured rapidly and inexpensively and reliably meets the requirements with respect to tightness.

According to the present invention, this object is achieved by forming the covering part by direct foaming around the bordering frame and of an edge area of the window.

Among the principal advantages achieved with the present invention are (1) that, by the direct foaming around the bordering frame and an edge area of the window, a hatchback with a covering part is provided which has a simple construction, i.e., few components; (2) the hatchback can be manufactured rapidly and at a low price; and (3) the mounting expenditures are reduced significantly. Additional fastening elements for the covering part are not required. A perfect fit of the covering part is always ensured relative to the bordering frame and to the window. In addition, no tolerance problems during the mounting occur in the case of this hatchback, and the entering of water is prevented between the bordering frame, the window and the covering part into the trunk dispose underneath.

BRIEF DESCRIPTION OF THE DRAWINGS

These and other objects, features and advantages of the present invention will become more readily apparent from the following detailed description of several presently preferred embodiments when taken in conjunction with the accompanying drawings wherein:

FIG. 5 is a perspective view similar to FIG. 1 but of another embodiment of a hatchback for a motor vehicle; and FIG. 6 is an enlarged sectional view along Line VI—VI of FIG. 5.

DETAILED DESCRIPTION OF THE DRAWINGS

Figure 1:
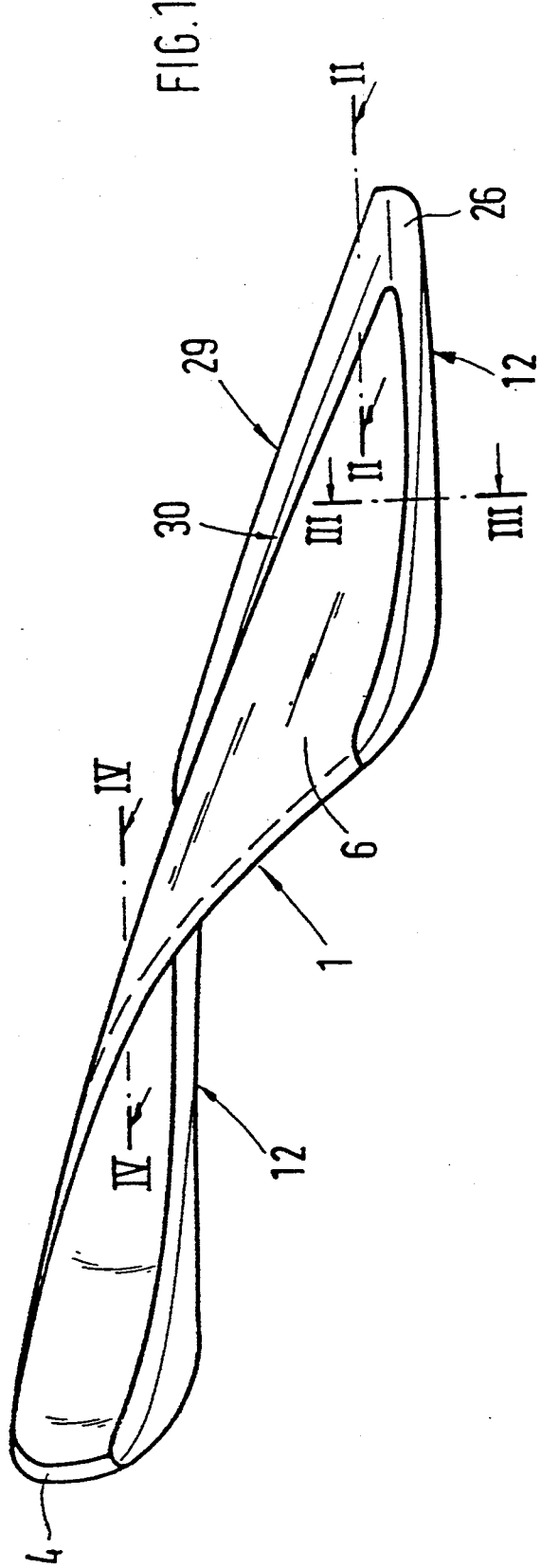
FIG. 1 is a perspective view of a hatchback of a motor vehicle in accordance with the present invention.
Figure 4:
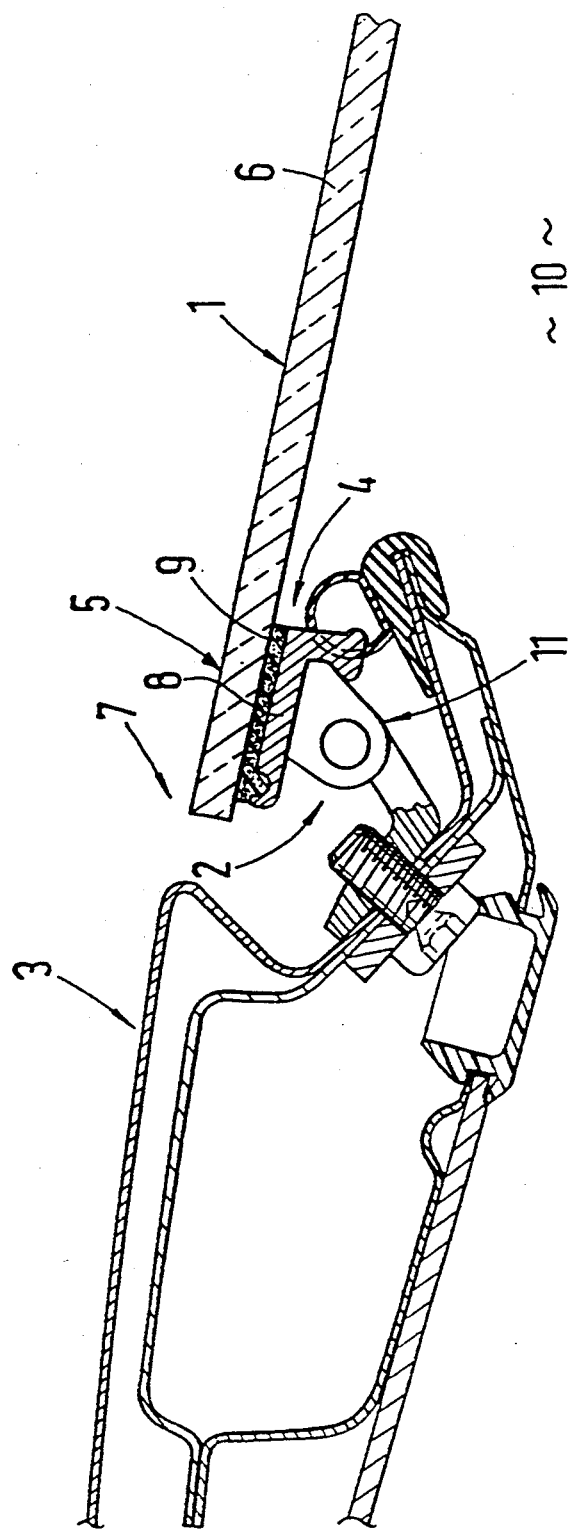
FIG. 4 is an enlarged sectional view along Line IV—IV of FIG. 1.

In the area shown in FIG. 1, the motor vehicle comprises a hatchback 1 which is linked to a vehicle body 3 (FIGS. 2 and 4) on covered hinges 2 (FIG. 4). The hatchback 1 is formed by a bordering frame 4 which is glued together with and surrounds an edge area 5 of a window 6.

The bordering frame 4 comprises several parts, the individual parts being connected with one another by welding. At the transversely extending upper edge 7 of the hatchback 1, the bordering frame 4 is formed by a step-shaped extruded section 8 which, by way of a gluing body 9, is connected with a side (interior side) of the window 6 facing a trunk area 10. The hatchback-side hinge halves 11 of the hinges 2 are mounted locally by welding at this extruded section 8 as shown in FIG. 4.

Figure 3:
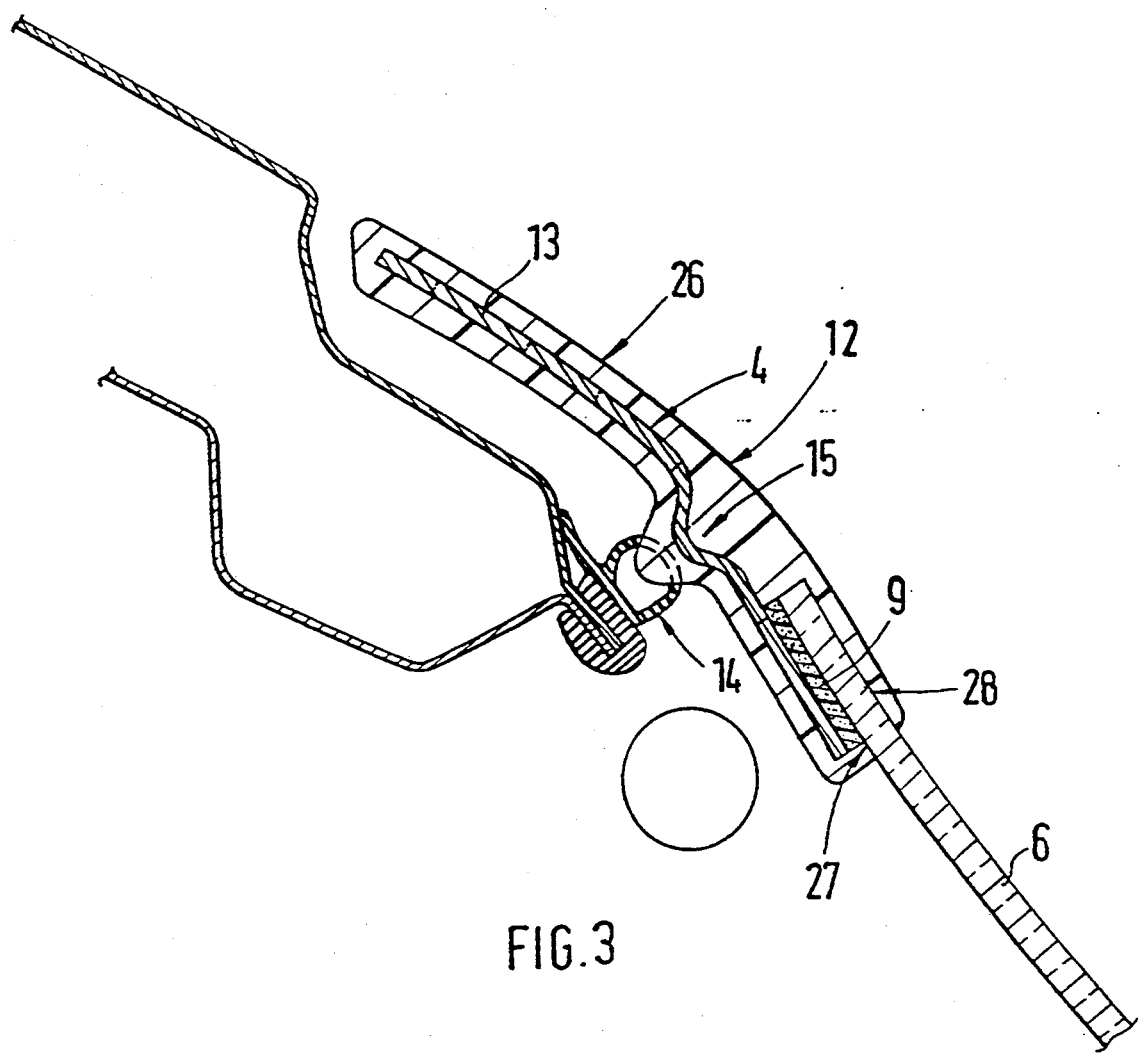
FIG. 3 is an enlarged sectional view along Line III—III of FIG. 1.

In a laterally exterior, longitudinally directed area 12 as shown in FIGS. 1 and 3, the bordering frame 4 is formed by a profiled sheet metal part 13 which, also by way of the gluing body 9, is connected with the interior side of the window 6. In the area of a body-side sealing body 14, the sheet metal part 13 has an indentation 15 directed to the interior toward the sealing body 14.

Figure 2:
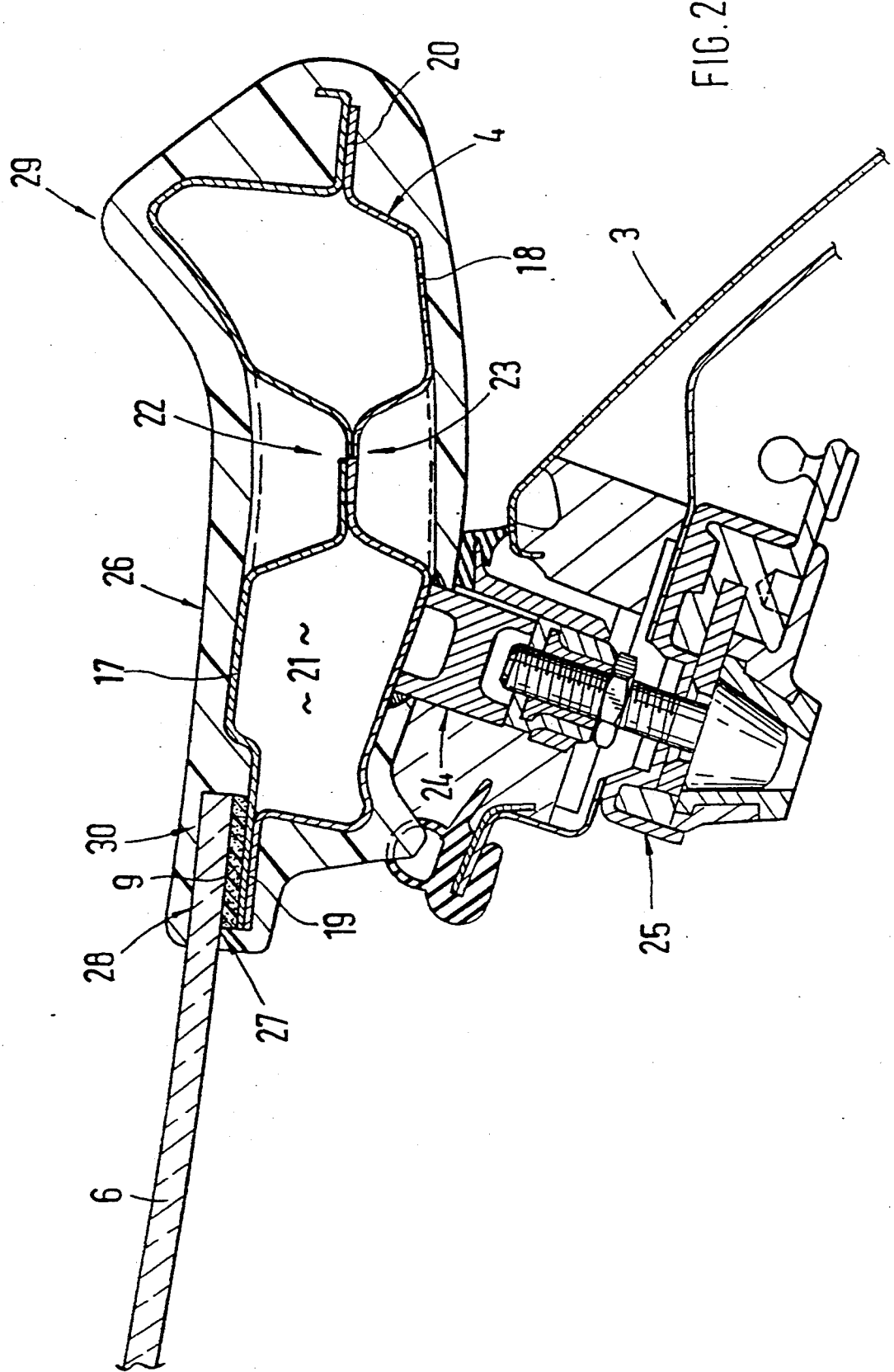
FIG. 2 is an enlarged sectional view along Line II—II of FIG. 1.

In the rear transversely extending area 30 of the hatchback 1 shown in FIGS. 1 and 2, the bordering frame 4 comprises two sheet steel stampings 17, 18 which are fitted together on end-side flanges 19, 20 aiming in the same direction to form a box-shaped hollow support 21. Locally, cup-shaped inwardly directed impressions 22, 23 are provided at both sheet steel stampings 17, 18, the two opposite impressions 22, 23 resting against one another on the bottom side. Lock accommodating devices 24 are mounted locally on the hollow support 21. These devices 24 project diagonally downward from the interior side of the hollow support 21 and interact or cooperate with a lock 25 on the body side. The window 6, by virtue of the gluing body 9, rests on and is fastened to the stepped flange 19 of the box-shaped hollow support 21. The entire bordering frame 4 is manufactured as a light-metal, e.g., aluminum or steel, construction.

According to the present invention, the hatchback 1 is equipped with a covering part 26 which, according to FIG. 1, extends along the rear transversely extending area 30 and along the two laterally exterior, longitudinally directed areas 12 of the bordering frame 4. At the upper edge of the hatchback 1 shown in to FIG. 1, no covering part is provided, in contrast to the embodiment of FIG. 5 where the covering part 26 extends along the entire circumferential course of the bordering frame 4. The covering part 26 is formed by a direct foaming around the bordering frame 4 and an edge area 5 of the window 6. According to FIGS. 2, 3 and 6, the covering part 26 extends along the entire circumference of the cross-sectional shape of the bordering frame 4 with the exception of the area in which the gluing body is situated. In addition, the covering part 26 covers an interior edge area 27 and an exterior edge area 28 of the window 6. The covering part 26 is PU-foam or another suitable foam, the surface of the foaming being able to receive a final paint coat.

The rear, transversely extending area 30 and/or the laterally exterior, longitudinally directed areas 12 of the bordering frame 4 and the covering part 26, corresponding to FIGS. 1, 2 and 4, form a rear-side air guiding device 29.

The manufacture of the hatchback 1 together with the hatchback-side hinge halves 11, the lock accommodating devices 24, and the spherical-head-type linking points for the gas springs (which are not shown in detail) takes place in such a manner that the window 6 which, by way of the gluing body 9, on the side of the circumference, is connected with the bordering frame 4, is placed in a foaming tool together with the bordering frame 4 and that subsequently the desired circumferential area of the bordering frame 4 and the window 6, in one operation, is provided with a surrounding foaming with PU-foam which forms the covering part 26.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A hatchback for a motor vehicle, comprising a window with a circumferential edge area, a bordering frame which surrounds and is glued together with the circumferential edge area of the window, and an elastic covering part which extends at least partially around the circumferential edge area of the window and the bordering frame and which, along the circumferential edge area where it extends, is directly applied by a foaming process around substantially an entire cross-sectional outer surface of the bordering frame and the circumferential edge area of the window.

2. The hatchback according to claim 1, wherein the covering part extends over almost the entire circumference defined by a cross-sectional shape of the bordering frame as well as an interior edge area and an exterior edge area of the window.

3. The hatchback according to claim 1, wherein the bordering frame is formed locally by plural sheet steel stampings which, at end-side flanges directed in the same direction, are fitted together to form a box-shaped hollow support.

4. The hatchback according to claim 1, wherein the bordering frame is formed locally by a step-shaped profiled extruded part.

5. The hatchback according to claim 1, wherein the bordering frame is light metal.

6. The hatchback according to claim 1, wherein at least hatchback-side hinge halves and lock receiving devices are mounted to the bordering frame.

7. The hatchback according to claim 1, wherein a rear transversely extending area and/or laterally exterior longitudinally extending areas of the bordering frame and of the covering part form a rear-side air guiding device.

8. The hatchback according to claim 1, wherein the covering part is arranged along the entire circumference of the bordering frame.

9. The hatchback according to claim 1, wherein the covering part is provided only in the rear transversely extending area and/or along laterally exterior longitudinally directed areas of the bordering frame and of the window.

10. A process for the manufacturing a hatchback according to claim 1, comprising the steps of connecting the window with the bordering frame by way of a gluing body on the circumferential, placing side the window in a foaming tool together with the bordering frame, and subsequently surrounding a desired circumferential area of the bordering frame and the window with a foam to form the covering part.

* * * * *